United States Patent
Truitt

(10) Patent No.: US 9,613,370 B2
(45) Date of Patent: Apr. 4, 2017

(54) SECURELY AND EFFICIENTLY PROCESSING TELEPHONE ORDERS

(71) Applicant: Teleperformance USA, Holladay, UT (US)

(72) Inventor: Alan Truitt, Draper, UT (US)

(73) Assignee: TELEPERFORMANCE SE, Paris (FR)

( * ) Notice: Subject to any disclaimer, the term of this patent is extended or adjusted under 35 U.S.C. 154(b) by 111 days.

(21) Appl. No.: 13/967,608

(22) Filed: Aug. 15, 2013

(65) Prior Publication Data

US 2015/0052016 A1    Feb. 19, 2015

(51) Int. Cl.
*G06Q 30/00* (2012.01)
*G06Q 30/06* (2012.01)
*G06Q 20/12* (2012.01)

(52) U.S. Cl.
CPC ......... *G06Q 30/0617* (2013.01); *G06Q 20/12* (2013.01); *G06Q 30/0635* (2013.01)

(58) Field of Classification Search
CPC ........... G06Q 30/0635; G06Q 30/0601–30/08; G06Q 30/0617
USPC ......................................... 705/44, 26.1–27.2
See application file for complete search history.

(56) References Cited

U.S. PATENT DOCUMENTS

| | | | |
|---|---|---|---|
| 5,918,213 A * | 6/1999 | Bernard | G06Q 20/12 705/26.35 |
| 6,373,939 B1 | 4/2002 | Reese et al. | |
| 6,442,251 B1 | 8/2002 | Maes et al. | |
| 6,766,007 B1 | 7/2004 | Dermler et al. | |
| 7,561,676 B2 | 7/2009 | Fernandes et al. | |
| 7,792,095 B2 | 9/2010 | Srinivansan | |
| 7,908,381 B2 | 3/2011 | Koch et al. | |
| 8,117,084 B2 | 2/2012 | Siegrist | |
| 8,265,247 B2 | 9/2012 | Baccay | |
| 8,306,868 B2 | 11/2012 | Sivanathan et al. | |
| 2003/0187752 A1 | 10/2003 | Kapiainen et al. | |
| 2005/0165648 A1* | 7/2005 | Razumov | G06Q 30/0603 705/26.41 |
| 2006/0265327 A1 | 11/2006 | Rao et al. | |
| 2008/0064363 A1 | 3/2008 | Salafia et al. | |

(Continued)

OTHER PUBLICATIONS

PCI Council Sets Call Center Guidance, Mar. 21, 2011, American Banker, vol. 176.*

(Continued)

*Primary Examiner* — Jason Dunham
*Assistant Examiner* — Brittney N Miller
(74) *Attorney, Agent, or Firm* — Kunzler Law Group

(57) ABSTRACT

An apparatus for processing telephone orders includes a communications module that establishes a telephonic connection between a customer service representative of a merchant and a customer, and an identification module that receives an identifier linking the customer to a billing profile a billing profile access module that receives electronic access to the billing profile. The billing profile includes billing information of the customer. The apparatus includes a transaction module that processes a sales order using the billing profile of the customer in response to a customer approval of the sales order. The sales order is for a product and/or a service offered by the merchant. The billing information of the billing profile is unavailable for viewing by the customer service representative.

25 Claims, 9 Drawing Sheets

(56) References Cited

U.S. PATENT DOCUMENTS

| | | |
|---|---|---|
| 2010/0241566 A1 | 9/2010 | Kim |
| 2010/0262506 A1 | 10/2010 | Zargahi et al. |
| 2010/0299178 A1 | 11/2010 | Druzhnikov |
| 2012/0231876 A1 | 9/2012 | de Cuba |
| 2012/0310752 A1* | 12/2012 | Gaddis ................. 705/14.73 |
| 2013/0304638 A1* | 11/2013 | Schoenberg ................. 705/39 |
| 2014/0302814 A1* | 10/2014 | Roncoroni et al. ........... 455/408 |

OTHER PUBLICATIONS

Yung Fu Chang, et al., Smart Phone for Mobile Commerce, Computer Standards & Interfaces, www.elsevier.com/locate/csi, Available Online Oct. 26, 2008.

PCT/US2014/051336, International Search Report and Written Opinion, mailed: Nov. 4, 2014.

U.S. Appl. No. 14/198,384 Notice of Allowance mailed Mar. 11, 2015.

U.S. Appl. No. 14/198,384 Office Action mailed Aug. 6, 2014.

U.S. Appl. No. 14/198,384 Office Action mailed Jan. 2, 2015.

U.S. Appl. No. 15/014,938, filed Feb. 3, 2016, Office Action mailed May 9, 2016.

* cited by examiner

SECURELY AND EFFICIENTLY PROCESSING TELEPHONE ORDERS

FIELD

This invention relates to telephone order processing and more particularly relates to secure and more efficient telephone order processing and request handling.

BACKGROUND

Online shopping has proliferated in the last decade and continues to grow. Websites allow consumers to make purchases without the assistance of a customer service representative, streamlining the shopping experience. In addition, the automated storage and retrieval of customer information, including billing information, makes online transactions faster and more secure. For certain products and services, however, consumers may still need to speak to a customer service representative. These products and services are generally more complex and unfamiliar to consumers, and customer service representatives can help businesses complete a sale faster and more accurately than a website alone. In general, customers who place an order through a customer service representative will often give their billing information directly to the customer service representative in order for the customer sales representative to process the order. If a business already has a customer's billing information stored in its computer system, the customer service representative will often have access to and can view the customer billing information in order to process a sales order. In many cases, however, companies do not have the billing information for customers when they are calling to place an order, and this information must be captured to complete the order.

SUMMARY

An apparatus for processing telephone orders includes a communications module, an identification module, a billing profile access module, and a transaction module. In one embodiment, the communications module establishes a telephonic connection between a customer service representative of a merchant and a customer. In another embodiment, the identification module receives an identifier alerting one or more of the customer service representative and a computer system of the merchant that the customer has a billing profile, the identifier received in conjunction with the telephonic connection, the billing profile stored previous to the telephonic connection. In a certain embodiment, the billing profile access module receives electronic access to the billing profile. The billing profile includes billing information of the customer and is stored electronically at an independent location, such as the customer's electronic device or a third party computer system. In a certain embodiment, the billing profile is received in response to an action of the customer approving sending the billing profile to the billing profile access module. The customer action, in one form, may be to send the billing profile during the telephonic connection. In another form, the customer action may be a default setting that provides permission to send the billing profile in response to a telephonic connection with a customer service representative in which an identifier is sent. Yet another form of customer action is approving the sales order. In yet another embodiment, the transaction module processes a sales order using the billing profile of the customer in response to a customer approval of the sales order. The sales order is for a product and/or a service offered by the merchant and the billing information of the billing profile is unavailable for viewing by the customer service representative.

In one embodiment, the apparatus includes a confirmation module that receives the customer approval of the sales order prior to processing the sales order. In a particular embodiment, the customer approval includes verbal consent. In an embodiment, the confirmation module transmits an order approval request to the customer prior to receiving the customer approval and receives an electronic message that includes the customer approval. The order approval request includes information about the sales order. In a certain embodiment, the apparatus includes a security module that verifies the customer approval of the sales order. In one embodiment, the billing profile electronic access is received in response to the customer approval, and the electronic access to the billing profile includes receiving the billing profile, receiving a location of the billing profile, and/or enabling access to retrieve the billing profile.

In one embodiment, the apparatus includes a registration module that receives and stores the billing profile of the customer. The registration module receives and stores the billing profile in a transaction unrelated to the sales order. In another embodiment, the registration module operates outside control of the merchant. In a certain embodiment, the billing profile access module receives the billing profile from a third party storing the billing profile of the customer. In some embodiments, the identifier includes a link to the billing profile. The link is operable to access the billing profile.

In one embodiment, the billing profile access module receives the billing profile from an electronic device that transmits the identifier. In the embodiment, the registration module stores the billing profile in a location accessible to the electronic device. In another embodiment, the billing profile of the customer includes a credit card profile, a debit card profile, and/or a financial institution account profile for the customer. In another embodiment, the billing profile of the customer includes one or more of a shipping address, a residential address, a business address, a phone number, a fax number, and an email address of the customer. In yet another embodiment, the identification module notifies the customer service representative of the identifier when the communications module establishes the telephonic connection. In a further embodiment, the identifier is transmitted over a communication channel of the telephonic connection. In another embodiment, the identification module further transmits the billing profile along with the identifier.

A method for processing a telephone order includes establishing a telephonic connection between a customer service representative of a merchant and a customer. The method includes receiving an identifier alerting one or more of the customer service representative and a computer system of the merchant that the customer has a billing profile, the identifier received in conjunction with the telephonic connection, the billing profile stored previous to the telephonic connection. The identifier is transmitted electronically to the customer service representative in response to establishing the telephonic connection. The method includes receiving electronic access to the billing profile. The billing profile includes billing information of the customer and is stored electronically in a computer system external to a computer system available to the merchant and to the customer service representative. In a certain embodiment, the billing profile is received in response to an action of the customer approving sending the billing profile to the billing profile access module. The customer action, in one form, may be to send the billing profile during the telephonic connection. In another form, the customer action may be a default setting that provides permission to send the billing profile in response to a telephonic connection with a customer service representative in which an identifier is sent. Yet another form of customer action is approving the sales order. The method includes processing a sales order using the billing profile of the customer in response to a customer approval of the sales order. The sales order is for a product and/or a service offered by the merchant and the billing information of the billing profile is unavailable for viewing by the customer service representative. The method also includes, in one embodiment, receiving a customer approval of the sales order prior to processing the sales order. The method may also include sending sales order information to the customer prior to receiving the customer approval. The method may also include receiving and storing the billing profile of the customer in a transaction unrelated to the sales order.

An apparatus for placing a telephone order includes a registration module, a phone connection module, an identifier module, and a billing profile module. In one embodiment, the registration module creates and stores a billing profile of a customer. The billing profile includes a credit card profile, a debit card profile, and/or a financial institution account profile. In another embodiment, the phone connection module establishes a telephonic connection between the customer and a customer service representative of a merchant. In a particular embodiment, the identifier module sends an identifier to the customer service representative in response to the phone connection module establishing a telephonic connection. The identifier links the customer to a billing profile. In a certain embodiment, the billing profile module provides the customer service representative electronic access to the billing profile of the customer. The customer service representative processes the sales order using the billing profile. The sales order is for a product and/or a service offered by the merchant and the billing information of the billing profile is unavailable for viewing by the customer service representative.

In one embodiment, the apparatus includes an order information module and an approval module. In an embodiment, the order information module receives sales order information from the customer service representative. In another embodiment, the approval module sends a customer approval to the customer service representative. The customer approval is to approve the sales order. Electronic access to the billing profile is provided to the customer service representative in response to the customer approval being sent to the customer service representative.

A method to place a telephone order includes creating and storing a billing profile. The billing profile includes a credit card profile, a debit card profile, and/or a financial institution account profile. The method includes establishing a telephonic connection between a customer and a customer service representative of a merchant. The method includes sending an identifier to the customer service representative electronically in response to establishing the telephonic connection. The identifier links the customer to a billing profile. The method includes providing the customer service representative electronic access to the billing profile. The customer service representative processes the sales order using the billing profile and the billing information of the billing profile is unavailable for viewing by the customer service representative. The sales order is for a product and/or a service offered by the merchant.

In one embodiment, the method includes receiving sales order information from the customer service representative. In another embodiment, the method includes ending a customer approval to the customer service representative. The customer approval is to approve the sales order. Electronic access to the billing profile is provided to the customer service representative in response to the customer approval being sent to the customer service representative.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
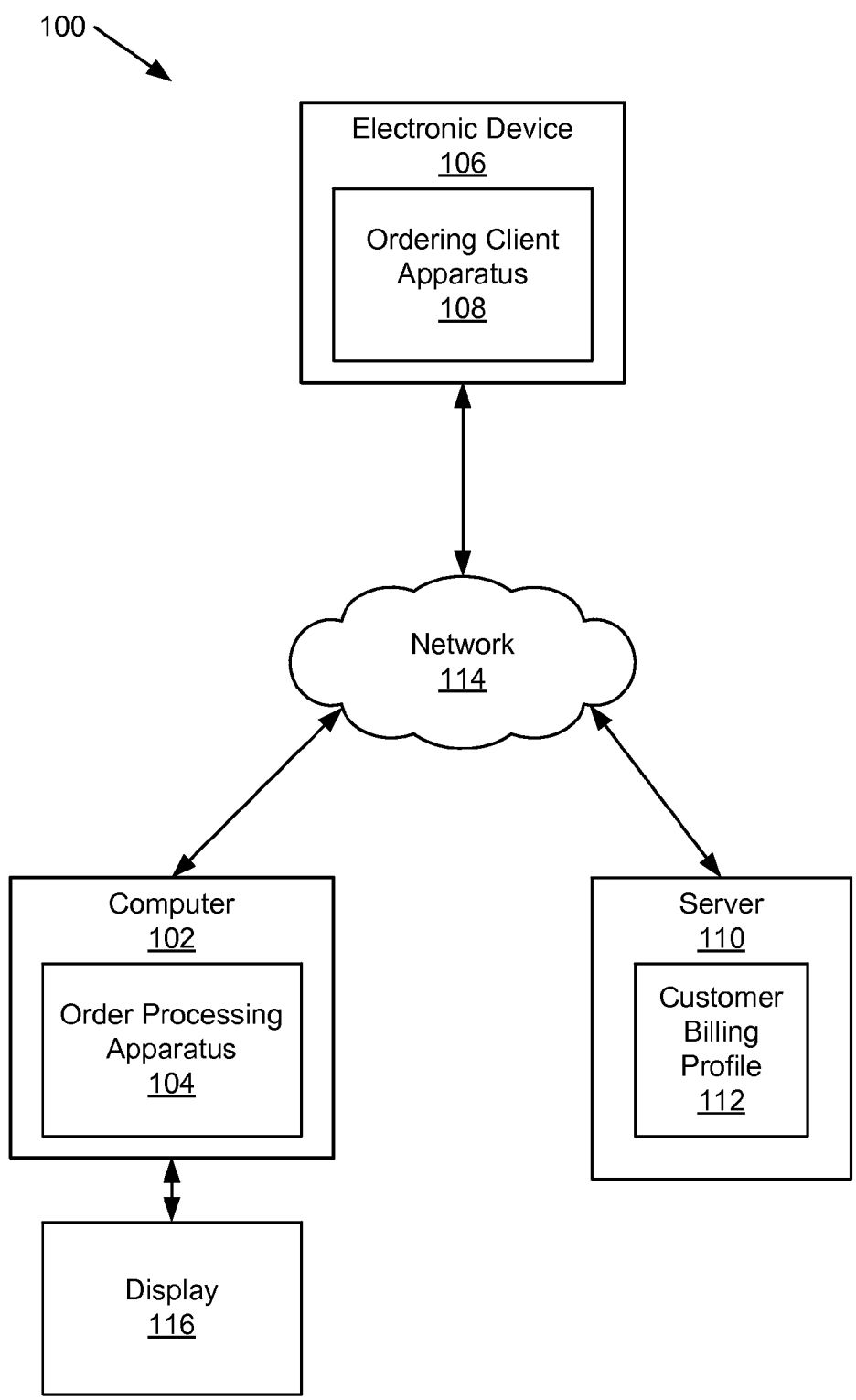
FIG. 1 is a schematic block diagram illustrating one embodiment of a system for processing telephone orders.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

This invention provides added security and efficiency in the processing of product orders with the help of customer service representatives. The invention encompasses apparatuses and methods that allow a customer to place a product order over a telephonic connection with a customer service representative without having to reveal his or her billing information, such as credit card or bank account number, to the customer service representative. With this invention, a customer can use an identifier to alert the merchant's computer system and the customer service representative that he or she has a customer billing profile stored at an independent location, such as the customer's electronic device or a third party computer system. When making his or her purchase, the customer can send his or her customer billing profile directly to the merchant, give approval for access to his or her customer billing profile on another system, or by default, give permission to send the customer billing profile in response to having already given the customer service representative his or her identifier during a telephonic connection. Throughout the transaction, the customer service representative cannot see the customer billing profile, which increases the security of the orders and a customer's financial information.

FIG. 1 is a schematic block diagram illustrating one embodiment of a system 100 for processing telephone orders. The system 100 includes a computer 102, an order processing apparatus 104, an electronic device 106, an ordering client apparatus 108, a server 110, a customer billing profile 112, and a network 114, which are described below.

The system 100, in one embodiment, includes a computer 102 with an order processing apparatus 104. The computer 102 may be connected to a display 116. The order processing apparatus 104, in one example, receives customer data over a network 114 from an electronic device 106. The electronic device 106, in one embodiment, includes an ordering client apparatus 108 to process a purchase order. In one embodiment, the order processing apparatus 104 accesses a customer billing profile 112 on a server 110 over a network to process a purchase order. The order processing apparatus 104 is described in more detail with respect to the apparatus 200 in FIG. 2 and the apparatus 300 in FIG. 3. The electronic device 106, in one embodiment, has an ordering client apparatus 108 and may be any device capable of sending customer data to a computer 102 over a network 114. For example, the electronic device 106 may be a laptop or a desktop computer. In another example, the electronic device 106 may be a tablet. Alternatively, the electronic device 106 may be a smartphone. The ordering client apparatus 108 is described in more detail with respect to the apparatus 400 in FIG. 4 and the apparatus 500 in FIG. 5.

The network 114 may include a local area network ("LAN"), a wide area network ("WAN"), wireless network, cellular network, the Internet, a fiber optic network, or the like. In one embodiment, the network 114 includes multiple networks. For example, the network 114 may include a cellular network along with another network capable Internet connection. In another example, the network 114 includes a wireless network along with a wired network. The network 114 may include switches, routers, servers, cabling and other equipment known to those in the art. The server 110 may be any computer accessible by a computer 102 over a network 114, including but not limited to a database server, a mainframe server, a workstation, a desktop computer, etc.

In one embodiment, a customer billing profile 112 for one or more customers is stored on the server 110 before it is accessed by the order processing apparatus 104. The server 110, in one embodiment, is a computer system external to a computer system available to a merchant or a customer service representative. A customer billing profile 112 typically contains billing information for a customer. The billing profile may include the customer's credit card profile, debit card profile, financial institution account profile, etc. A credit card profile may include account information for one or more credit cards, where the account information includes information such as the credit card account number, the credit card expiration date, the credit card security code, and the credit card billing address. A debit card profile may include account information for one or more debit cards (including prepaid debit cards), where the account information may include information such as the debit card account number, the debit card expiration date, the debit card security code, and/or the debit card personal identification number (PIN). A financial institution may be a bank, a credit union, a trust company, etc. A financial institution account profile may include account information for one or more financial institution accounts, where the account information may include the financial institution account number, routing transit number, or other account information.

A customer billing profile 112 may also include additional information of the customer. For example, the billing profile 112 may include a shipping address, a residential address, a business address, a phone number, a fax number, an email address of the customer, or other information that would be useful in completing a transaction, signing up for a service or other transaction initiated with a phone call.

Figure 2:
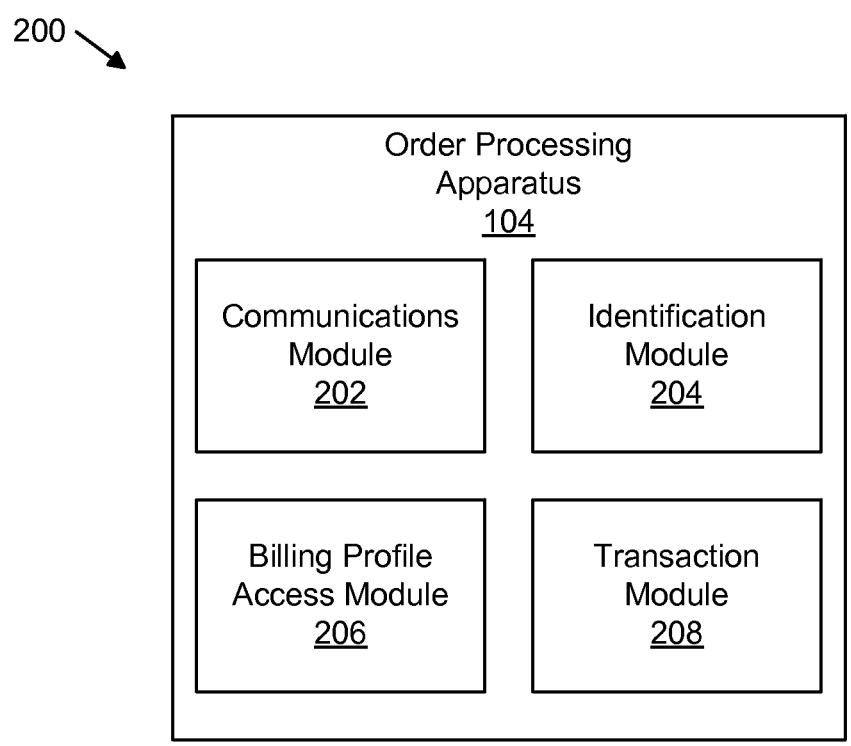
FIG. 2 is a schematic block diagram illustrating one embodiment of an apparatus for processing telephone orders.

FIG. 2 is a schematic block diagram illustrating one embodiment of an apparatus 200 for processing telephone orders. The apparatus 200 includes one embodiment of an order processing apparatus 104 with a communications module 202, an identification module 204, a billing profile access module 206, and a transaction module 208, which are described below.

The communications module 202, in one embodiment, establishes a telephonic connection between a customer service representative of a merchant and a customer. The communications module 202 may establish the telephonic connection in response to a connection request from an electronic device 106 used by a customer or by sending a connection request to an electronic device 106 used by a customer. In one form, the telephonic connection is a fixed line connection established over a public switched telephone network ("PSTN") and may include a wired phone or a wireless handset connection to a base. In another form, the telephonic connection is a wireless connection established over a cellular network. In another embodiment, the telephonic connection is an internet protocol ("IP") based connection established over IP networks such as the Internet. As another example, the telephonic connection is part of an audiovisual connection established over the Internet. The telephonic connection may also be an exchange of Short Message Service ("SMS") messages.

In one embodiment, the identification module 204 receives an identifier from an electronic device 106 alerting one or more of the customer service representative and a computer system of a merchant that a customer has a billing profile. In this embodiment, the customer billing profile 112 was stored previous to the establishment of the telephonic connection. In one embodiment, the identifier is in a form that allows a customer to be associated with a customer billing profile 112. For example, the identifier may be a combination of letters, numbers, or both. In another example, the identifier may be a picture, photograph, sound, etc. The identifier, in yet another embodiment, may be a hyperlink reference that allows access to a customer billing profile 112. In one embodiment, the identifier is transmitted over a communication channel of the telephonic connection. In another embodiment, the identifier is transmitted over a different communication channel than the telephonic connection. The identification module 204, in another embodiment, transmits the customer billing profile 112 along with the identifier. In a further embodiment, the identification module 204 notifies the customer service representative of the identifier when the communications module 202 establishes the telephonic connection between a customer and a customer service representative. In another embodiment, the identification module 204 notifies the customer service representative at a later time or, for example, in response to an inquiry by the customer service representative. For instance, the customer service representative may access a service that notifies the customer service representative that the customer has an identifier or may transmit a request to the electronic device 106 to request the identifier and the identification module 204 sends the identifier in response to the request.

The billing profile access module 206, in one embodiment, receives electronic access to a customer billing profile 112. In one embodiment, the billing profile access module 206 receives electronic access to a customer billing profile 112 by sending at least a portion of the identifier for a customer to the server 110, which may use the identifier information to locate the customer billing profile 112 associated with the identifier. The identifier may provide access so that the billing profile access module 206 may read information in the customer billing profile 112, may retrieve one or more files from the server 110 with the customer billing profile 112, the identifier may include a command to for the server to send the customer billing profile 112, etc. In another embodiment, the billing profile access module 206 received electronic access to the customer billing profile 112 by receiving the customer billing profile 112. For example, the electronic device 106 may send the customer billing profile 112. The electronic device 106 may receive the customer billing profile 112 from the server 110 or may store the customer billing profile 112. In another embodiment, the electronic device 106 sends a request to the server 110 to send the customer billing profile 112 to the customer service representative. One of skill in the art will recognize other ways that the billing profile access module 206 may receive electronic access to the customer billing profile 112.

In another embodiment, the billing profile access module 206 receives electronic access to a customer billing profile 112 in response to an action by the customer that approves sending the customer billing profile 112 to the billing profile access module 206. The action by the customer may be an act by the customer to sending the customer billing profile 112 during the telephonic connection. In a different embodiment, the action by the customer may be a default setting that provides permission to send the customer billing profile 112 in response to a telephonic connection with a customer service representative in which the identifier is sent. Furthermore, the action by the customer may be approving the sales order. The billing profile access module 206, in one form, receives electronic access to a customer billing profile 112 by receiving the customer billing profile 112 from a third party storing the customer billing profile 112. In another form, the billing profile access module 206 receives electronic access to the customer billing profile 112 by receiving a location or an address (e.g., hyperlink) of the customer billing profile 112. In yet another form, the billing profile access module 206 receives electronic access to the customer billing profile 112 by being granted access to retrieve the customer billing profile 112. In a further form, the billing profile access module 206 receives the customer billing profile 112 from the electronic device 106 that transmits the identifier.

The transaction module 208, in one embodiment, processes a sales order using a customer billing profile 112. The sales order may be for one or more products, services, or a combination of products and services offered by a merchant. In one embodiment, the transaction module 208 processes a sales order using a customer billing profile 112 in response to a customer approval of the sales order. During the processing of the sales order by the transaction module 208, the billing information of the customer billing profile 112 is unavailable for viewing by the customer sales representative. For example, the customer sales representative would be unable to view a credit card number, credit card expiration date, or credit card security code. As another example, the customer sales representative would be unable to view a financial institution account number or routing transit number. Shielding the billing information of the customer billing profile 112 from the view of a customer sales representative enhances security by limiting the number of people who have access to the billing information.

Figure 3:
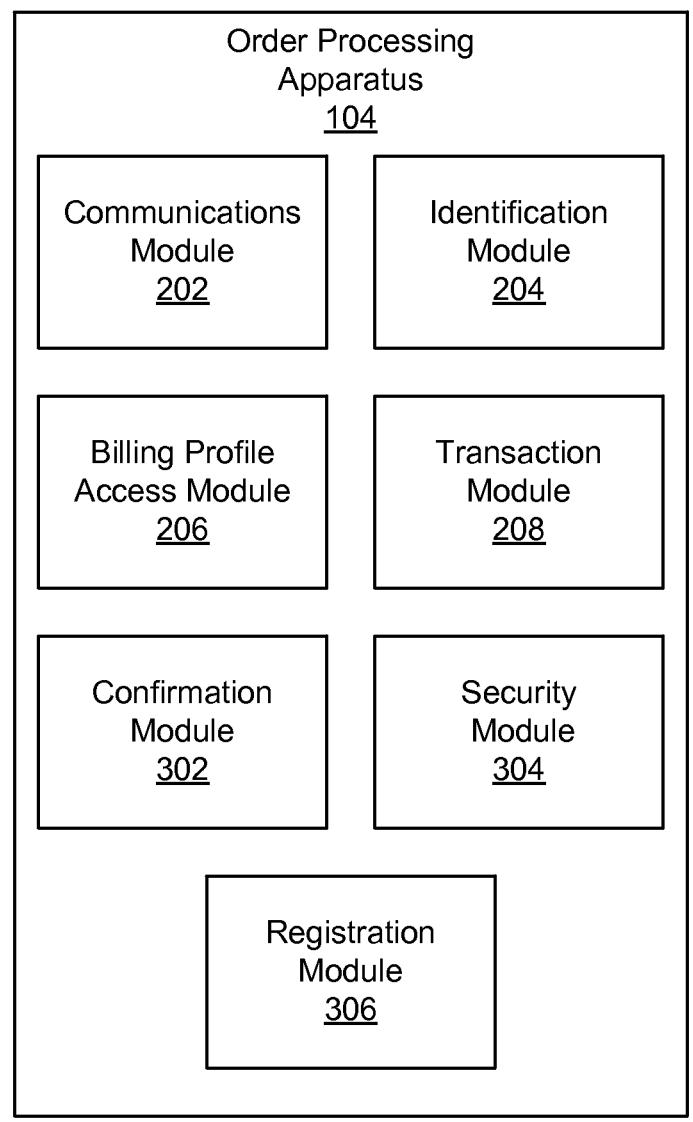
FIG. 3 is a schematic block diagram illustrating another embodiment of an apparatus for processing telephone orders.

FIG. 3 is a schematic block diagram illustrating another embodiment of an apparatus 300 for processing telephone orders. The apparatus 300 includes one embodiment of an order processing apparatus 104 with a communications module 202, an identification module 204, a billing profile access module 206, a transaction module 208, a confirmation module 302, a security module 304, and a registration module 306, which are described below.

The communications module 202, identification module 204, billing profile access module 206, and transaction module 208 in FIG. 3 are substantially similar to the modules described above with respect to the apparatus 200 in FIG. 2. The confirmation module 302, in one embodiment, receives a customer approval of the sales order prior to the processing of the order. For example, the confirmation module 302 may transmit an order approval request to a customer prior to receiving the customer approval. The order approval request may include information about the sales order, such as a final price of the sales order, a description of a product or service being purchased, a price of a product or service being purchased, or the quantity of a product or service being purchased. In another embodiment, the confirmation module receives an electronic message containing the customer approval. The customer approval may take many forms. As an example, the customer approval may be verbal consent. In another example, the customer approval may be a signature, a password, or a personal identification number ("PIN"). The customer approval, in another form, may be a biometric attribute of the customer (e.g., fingerprint, palm print, voice). In another example, the customer approval may be a reply to the order approval request. The reply may be text, a check box on the order approval request, a PIN, etc.

The security module 304 verifies the customer approval of the sales order by matching the customer approval with a sample previously provided by the customer. For example, the security module 304 may verify a customer's signature by comparing it to a signature previously provided by the customer and stored on the server 110. In another example, the security module 304 may verify a customer's fingerprint by sending it to the server 110, where it may be compared to a fingerprint previously provided by the customer, and receives the result of the comparison. In this example, by sending the customer approval to the server 110 for comparison, the comparison may enhance security by limiting access to an original and authentic customer approval previously provided by the customer.

The registration module 306, in one embodiment, receives and stores a customer billing profile 112 of a customer. In one embodiment, the registration module 306 receives and stores a customer billing profile 112 in a transaction unrelated to a sales order. For example, the registration module 306 may receive and store the customer billing profile 112 while signing the customer up for a service, for example, with a company independent of the company of the customer service representative. In another embodiment, the registration module 306 operates without the involvement of a merchant. For example, without involvement of a merchant associated with the customer service representative. In this embodiment, the merchant typically has no control over and is independent from the registration module 306 when it receives and stores a customer billing profile 112. The merchant, in the embodiment, may have no control over the customer billing profile 112, except for processing the sales order after receiving the identifier. The registration module 306, in one form, stores the customer billing profile 112 in a location accessible to the electronic device 106. For example, the registration module 306 may store the customer billing profile 112 on a computer 102 or a server 110 that may be accessed by the customer service representative and/or the computer 106.

Figure 4:
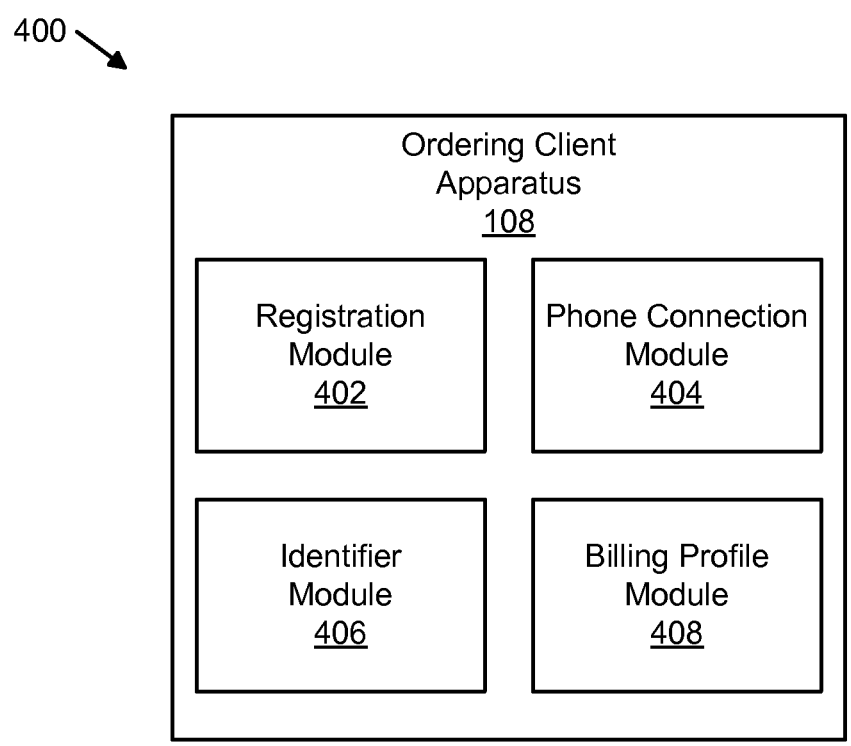
FIG. 4 is a schematic block diagram illustrating one embodiment of an apparatus for placing telephone orders.

FIG. 4 is a schematic block diagram illustrating one embodiment of an apparatus 400 for placing telephone orders. The apparatus 400 includes one embodiment of an ordering client apparatus 108 with a registration module 402, a phone connection module 404, an identifier module 406, and a billing profile module 408, which are described below.

In one embodiment, the registration module 402 in FIG. 4 is substantially similar to the registration module 306 in FIG. 3. In another embodiment, the registration module 402 creates and stores a customer billing profile 112 of a customer. The registration module 402, in an embodiment, creates and stores a customer billing profile 112 on the electronic device 106. In a further embodiment, the registration module 402 creates and stores a customer billing profile 112 in a location accessible to the electronic device 106. For example, the registration module 402 may create and store the customer billing profile 112 on a computer or a server 110.

The registration module 402, in one embodiment, is web-based. In another embodiment, the registration module 402 allows a third party, such as a representative of a company that stores customer billing profiles 112 to receive information over the phone from the customer and to enter the customer billing profile 112. The company may be a company that establishes a service with merchants for providing services or systems in conjunction with the embodiments described herein. Customers and/or merchants may desire such a service/system for enhanced security, in that the customer service representative does not view the sensitive customer billing profile 112 of the customer and sales transactions may take less time than traditional methods where customers relay sensitive financial and personal information over a phone to a customer service representative.

The phone connection module 404, in one embodiment, establishes a telephonic connection between a customer and a merchant customer service representative. In one embodiment, the phone connection module 404 establishes a telephonic connection between an electronic device 106 of a customer and the customer service representative. The telephonic connection is substantially similar to the telephonic connection previously described in relation to the apparatuses 200, 300 of FIGS. 2 and 3.

The identifier module 406, in one embodiment, sends an identifier to a customer service representative in response to the phone connection module 404 establishing a telephonic connection between a customer and the customer service representative. In one embodiment, the identifier module 406 sends the identifier in a communication channel of the telephonic connection. In another embodiment, the identifier module 406 sends the identifier in a communication channel separate from the telephonic connection. The identifier is substantially similar to the identifier described above in relation to the apparatuses 200, 300 of FIGS. 2 and 3. In one embodiment, the electronic device 106 is capable of both establishing the telephonic connection and sending the identifier. For example, the electronic device 106 may be a smartphone with an application that enables phone calls and sending the identifier. Other electronic devices 106, such as a tablet computer, a laptop or desktop computer, etc. may also be used. In another embodiment, one electronic device 106 establishes the telephonic connection and another electronic device 106 sends the identifier. For example, a customer may be on a telephone in front of a computer.

The billing profile module 408, in one embodiment, provides the customer service representative electronic access to the customer billing profile 112 of a customer. In one embodiment, the billing profile module 408 is substantially similar to the billing profile access module 206 in FIG. 3. In another embodiment, the billing profile module 408 transmits the customer billing profile 112 of a customer from the electronic device 106 to the billing profile access module 206 to be accessible to customer service representative. The customer service representative may then use the customer billing profile 112 to process the sales order for the customer, where the customer billing profile 112 is unavailable for viewing by the customer service representative.

Figure 5:
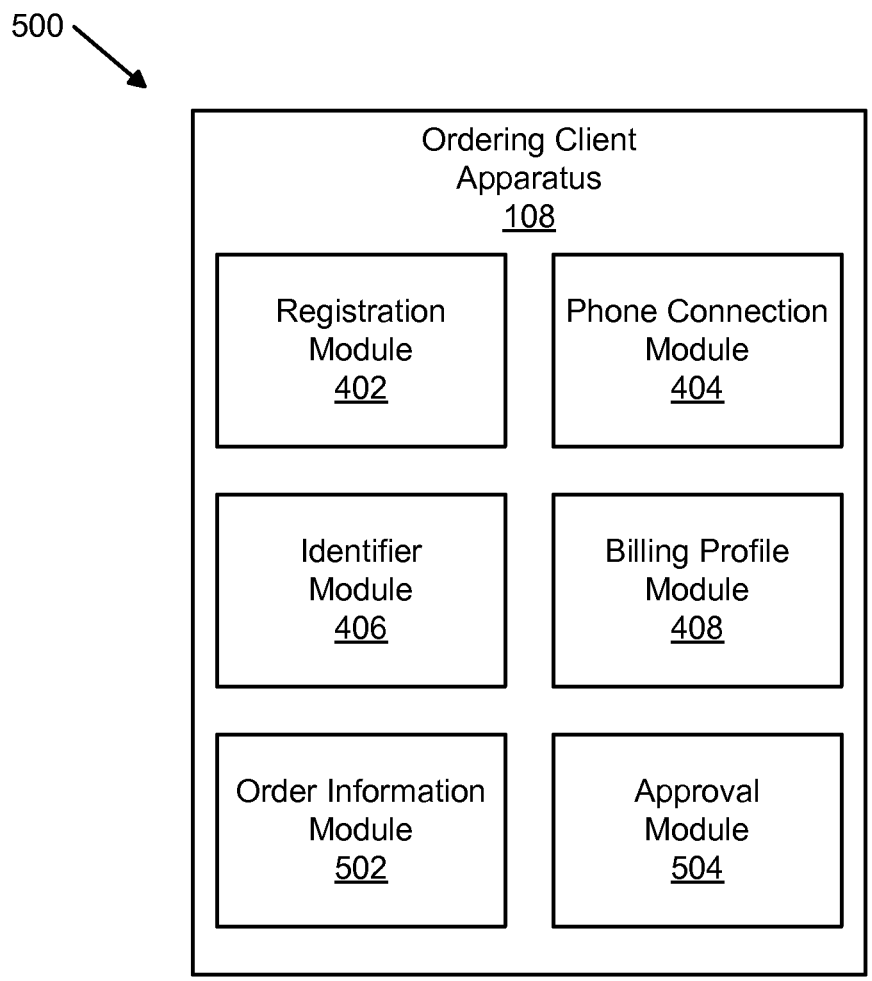
FIG. 5 is a schematic block diagram illustrating another embodiment of an apparatus for placing telephone orders.

FIG. 5 is a schematic block diagram illustrating another embodiment of an apparatus 500 for placing telephone orders. The apparatus 500 includes one embodiment of an ordering client apparatus 108 with a registration module 402, a phone connection module 404, an identifier module 406, a billing profile module 408, an order information module 502, and an approval module 504, which are described below.

The registration module 402, phone connection module 404, identifier module 406, and billing profile module 408 in FIG. 5, in one embodiment, are substantially similar to the modules previously described with respect to the ordering client apparatus 108 of FIG. 4. The order information module 502, in one embodiment, receives sales order information from the customer service representative. The sales order information may include a description of the order placed by the customer, or other information related to a sales transaction. In one form, the sales order information may include a description of a product or service being purchased, a price of a product or service being purchased, the quantity of a product or service being purchased, etc.

In one embodiment, the approval module 504 sends a customer approval of a sales order to a customer service representative. The customer approval may take many forms. As an example, the customer approval may be verbal consent. In another example, the customer approval may be a signature, a password, or a personal identification number ("PIN"). The customer approval, in another form, may be a biometric attribute of the customer (e.g., fingerprint, palm print, voice). In another embodiment, the customer approval may be a reply to the sales order information received by the order information module 502. The reply may be in the form of text, a checked checkbox, a PIN, a digital signature, etc.

Figure 6:
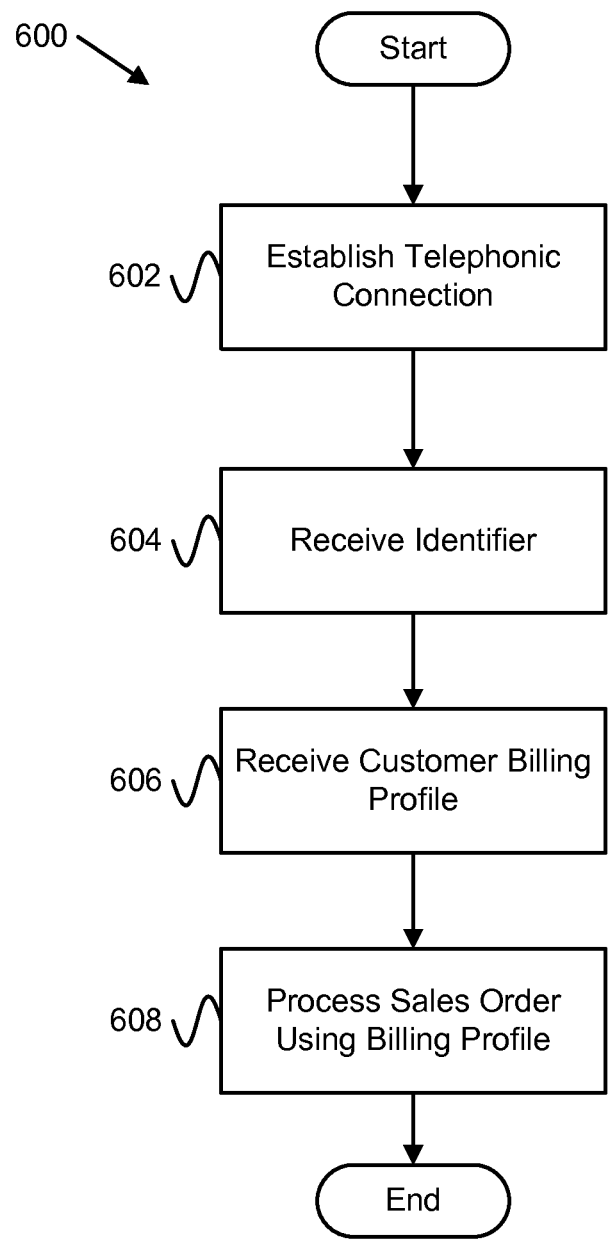
FIG. 6 is a schematic flow chart illustrating one embodiment of a method for processing telephone orders.

FIG. 6 is a schematic flow chart illustrating one embodiment of a method 600 for processing telephone orders. The method 600 begins and establishes 602 a telephonic connection between a customer and a customer service representative of a merchant. In one embodiment, the communications module 202 establishes the telephonic connection. In another embodiment, the phone connection module 404 establishes the telephonic connection. The method 600 receives an identifier alerting one or more of the customer service representative or a computer system of a merchant that the customer has a customer billing profile 112, the customer billing profile 112 stored electronically on a computer system external to a computer system available to the merchant or the customer service representative. In one form, the identification module 204 receives the identifier. The method 600 receives the customer billing profile 112. In one form, the customer billing profile 112 is received by the billing profile access module 206. In another embodiment, the billing profile module 408 sends the customer billing profile 112. The method 600 processes a sales order of the customer using the customer billing profile 112 and method 600 ends. During method 600, the customer billing profile 112 is unavailable for viewing by the customer service representative.

Figure 7:
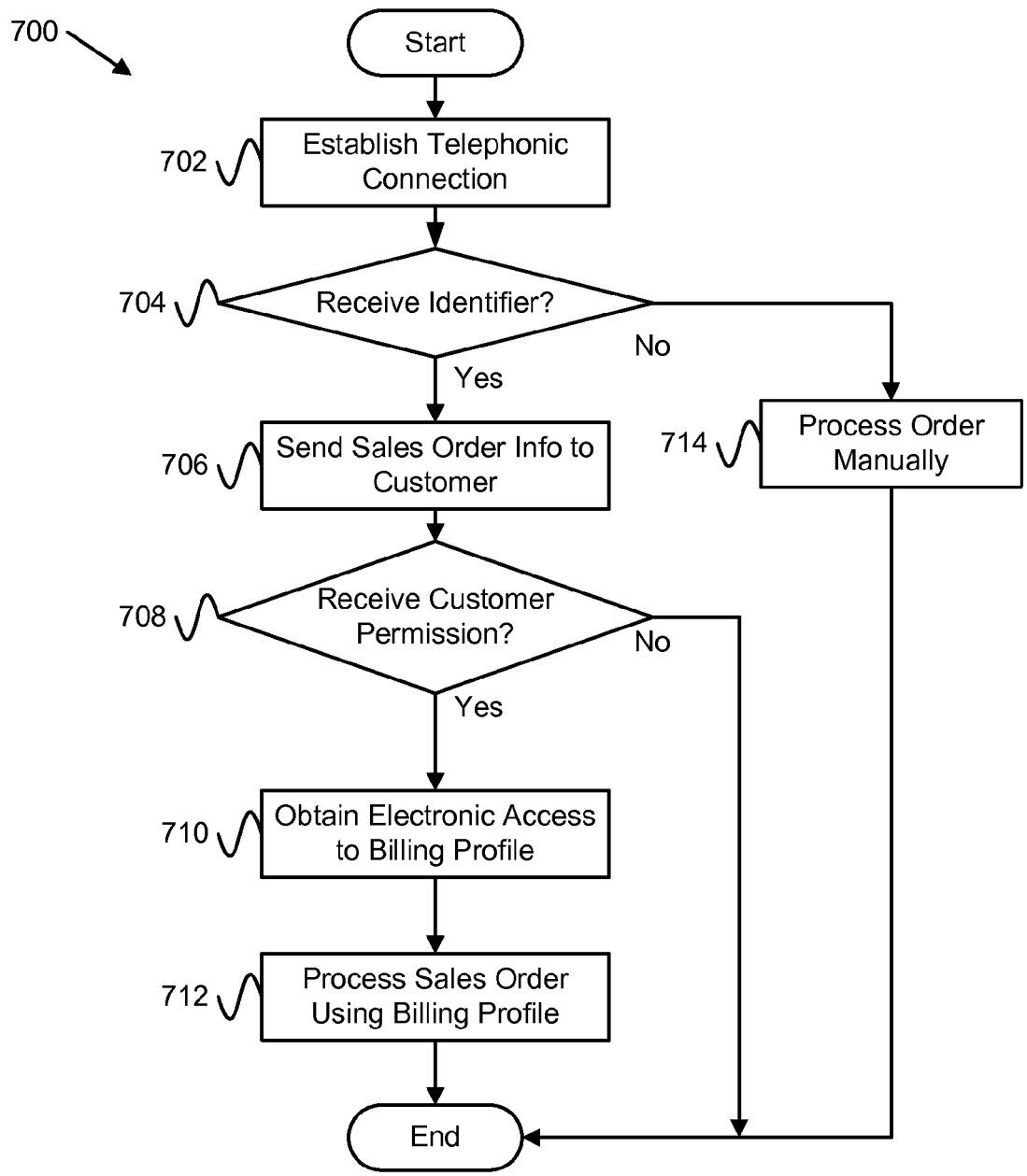
FIG. 7 is a schematic flow chart illustrating another embodiment of a method for processing telephone orders.

FIG. 7 is a schematic flow chart illustrating another embodiment of a method 700 for processing telephone orders. The method 700 begins and establishes a telephonic connection between a customer and a customer representative of a merchant. In one embodiment, the communications module 202 establishes the telephonic connection. In another embodiment, the phone connection module 404 establishes the telephonic connection. The method 700 determines 704 if an identifier linking a customer to a customer billing profile 112 has been received. If no identifier for the customer has been received, the method 700 processes 714 the sales order of a customer manually and the method 700 ends. If the method 700 determines 704 that an identifier has been received, the method 700 sends 706 the sales order information to the customer. In one embodiment, the identification module 204 determines 704 if the identifier has been received.

The method 700 determines 708 whether customer permission has been received. In one form, customer permission may be an action by the customer to send the customer billing profile 112 during the telephonic connection. Customer permission, in another form, can be a default setting that provides permission to send the customer billing profile 112 in response to a telephonic connection with a customer service representative in which the identifier is sent. Another form of customer permission can be a customer approving the sales order. If the method 700 determines 708 that no customer permission for the sales order has been received, the method 700 ends. If the method 700 determines 708 that a customer permission has been received, the method 700 obtains electronic access to the customer billing profile 112 linked to the previously received identifier. In one embodiment, the confirmation module 302 determines 708 if a customer approval is received. In another embodiment, the billing profile module 408 obtains electronic access to the customer billing profile 112. The method 700 processes 712 a sales order of the customer using the customer billing profile 112 and method 700 ends. During method 700, the customer billing profile 112 is unavailable for viewing by the customer service representative.

Figure 8:
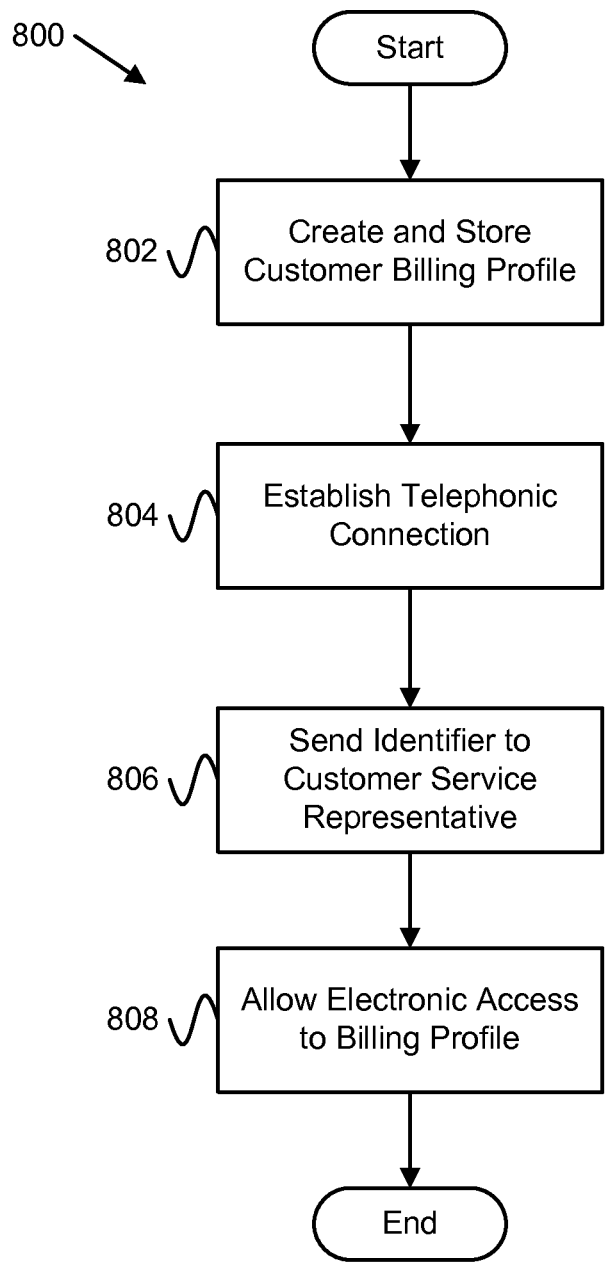
FIG. 8 is a schematic flow chart illustrating one embodiment of a method for placing telephone orders.

FIG. 8 is a schematic flow chart illustrating one embodiment of a method 800 for placing telephone orders. The method 800 begins and creates and stores 802 a customer billing profile 112. In one embodiment, the registration module 402 creates and stores 802 the customer billing profile 112. In another embodiment, the registration module 402 receives and stores the customer billing profile 112 of the customer in a transaction unrelated to the merchant and/or placing a sales order. The method 800 establishes 804 a telephonic connection between a customer and a customer service representative of a merchant. In an embodiment, the phone connection module 404 establishes the telephonic connection. The method 800 sends 806 electronically an identifier to the customer service representative in response to establishing the telephonic connection, the identifier alerting one or more of the customer service representative or a computer system of a merchant that the customer has a customer billing profile 112. In one embodiment, the identifier module 406 sends the identifier electronically. The method 800 allows 808 the customer service representative electronic access to the customer billing profile 112 and method 800 ends. The customer service representative processes a sales order of a customer using the customer billing profile 112. During method 800, the customer billing profile 112 is unavailable for viewing by the customer service representative.

Figure 9:
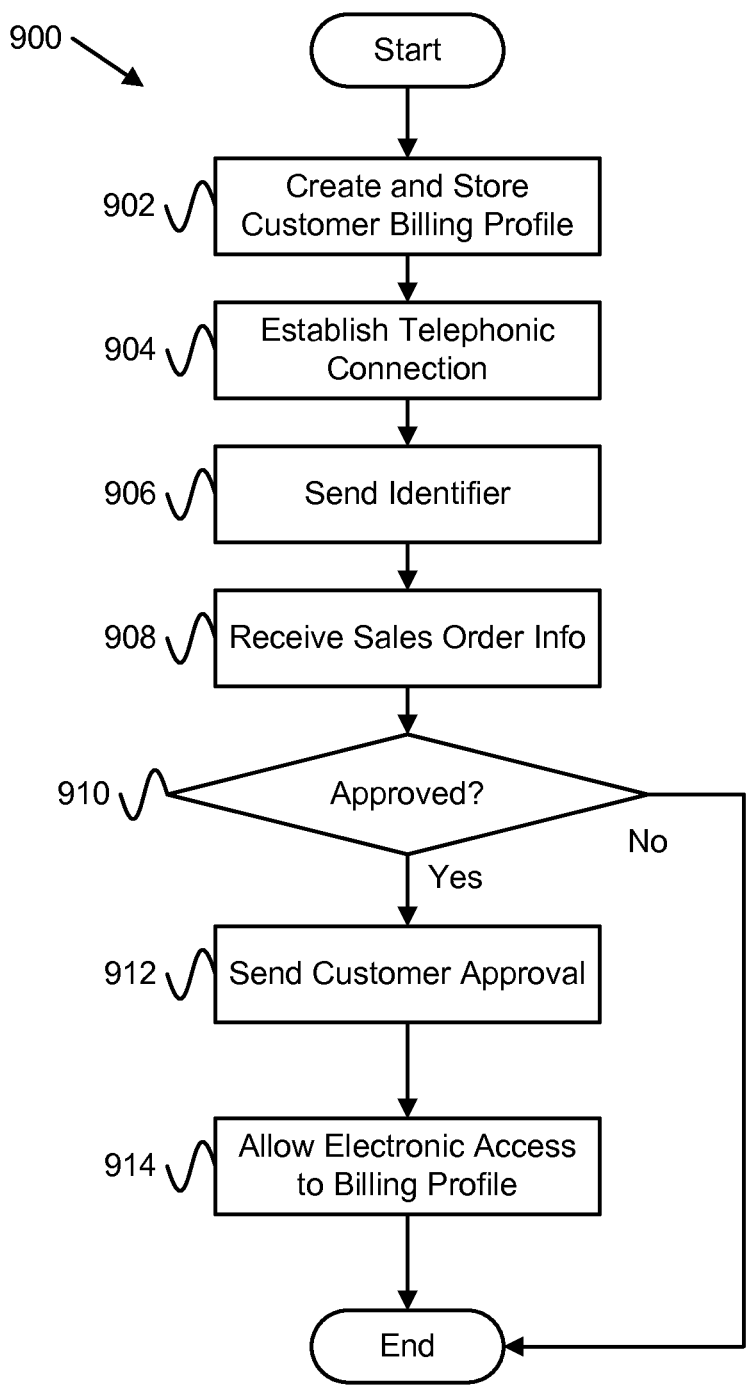
FIG. 9 is a schematic flow chart illustrating another embodiment of a method for processing telephone orders.

FIG. 9 is a schematic flow chart illustrating another embodiment of a method 900 for processing telephone orders. The method 900 begins and creates and stores 902 a customer billing profile 112. In one embodiment, the registration module 402 creates and stores the customer billing profile 112. The method 900 establishes 904 a telephonic connection between a customer and a customer service representative of a merchant. In an embodiment, the phone connection module 404 establishes the telephonic connection. The method 900 sends 906 electronically an identifier to the customer service representative in response to establishing the telephonic connection, the identifier alerting one or more of the customer service representative or a computer system of a merchant that the customer has a customer billing profile 112. In one embodiment, the identifier module 406 sends the identifier electronically. The method 900 receives 908 sales order information from the customer service representative. In one embodiment, the order information module 502 receives the sales order information. The method 900 determines 910 whether to approve the sales order. If the method 900 determines 910 that the sales order is not approved, the method 900 ends. If the method 900 determines 910 that the sales order is approved, the method 900 sends 912 the approval to the customer service representative. In one embodiment, the approval module 504 sends the customer approval. The method 900 allows 914 electronic access to the customer billing profile 112 linked to the previously sent identifier and method 900 ends. In one embodiment, the billing profile module 408 allows electronic access to the customer billing profile 112. During method 900, the customer billing profile 112 is unavailable for viewing by the customer service representative.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a communications module that establishes a telephonic connection between a customer service representative of a merchant and a customer;
   an identification module that receives an identifier, the identifier alerting a computer system of the merchant that the customer is associated with a billing profile stored on a computer system external to the computer system available to the merchant and the customer service representative and notifying the customer service representative that the customer is associated with the billing profile, wherein the identifier is one or more of an image and a hyperlink to access the billing profile stored on the external computer system, wherein the billing profile is electronically accessible from the external computer system, the identifier received in conjunction with establishing the telephonic connection, the billing profile electronically stored on the external computer system previous to the telephonic connection;
   a billing profile access module that receives electronic access to the billing profile, the billing profile comprising billing information of the customer, the billing profile being electronically accessed from the external computer system, via a network, by the computer system of the merchant to process a sales order between the customer and the merchant;
   a confirmation module that receives a customer approval of the sales order, wherein the customer approval comprises one or more of verbal consent, a signature, a password, a personal identification number, and a biometric attribute;
   a security module that verifies the customer approval of the sales order by matching the customer approval with a sample previously provided by the customer; and
   a transaction module that processes the sales order using the billing profile of the customer in response to the customer approval of the sales order, the sales order for one or more of a product and a service offered by the merchant, wherein the transaction module shields the billing information of the billing profile from the customer service representative, wherein the billing information is unavailable for viewing in a display of a computing device associated with the customer service representative while the sales order is processed,
   wherein at least a portion of the communications module, the identification module, the billing profile access module, the confirmation module, the security module, and the transaction module comprise one or more of hardware and executable code, the executable code stored on one or more computer readable storage media.

2. The apparatus of claim 1, wherein the billing profile is received in response to an action by the customer, the action approving sending the billing profile to the billing profile access module.

3. The apparatus of claim 2, wherein the action by the customer comprises one or more of
an action by the customer to send the billing profile during the telephonic connection;
a default setting that provides permission to send the billing profile in response to a telephonic connection with a customer service representative of a merchant in which the identifier is sent; and
an action by the customer to approve the sales order.

4. The apparatus of claim 1, wherein the identifier further comprises a sound.

5. The apparatus of claim 1, wherein the confirmation module transmits an order approval request to the customer prior to receiving the customer approval of the sales order, the order approval request comprising information about the sales order.

6. The apparatus of claim 1, wherein the billing profile electronic access is received in response to the customer approval of the sales order, the electronic access to the billing profile comprising one or more of receiving the billing profile, receiving a location of the billing profile, and enabling access to retrieve the billing profile.

7. The apparatus of claim 1, further comprising a registration module that receives and stores the billing profile of the customer, the registration module receiving and storing the billing profile in a transaction unrelated to the sales order.

8. The apparatus of claim 7, wherein the registration module operates outside control of the merchant.

9. The apparatus of claim 7, wherein the billing profile access module receives the billing profile from a third party storing the billing profile of the customer.

10. The apparatus of claim 7, wherein the billing profile access module receives the billing profile from an electronic device that transmits the identifier, the registration module storing the billing profile in a location accessible to the electronic device.

11. The apparatus of claim 1, wherein the billing profile of the customer comprises one or more of a credit card profile, a debit card profile, and a financial institution account profile for the customer.

12. The apparatus of claim 1, wherein the billing profile of the customer comprises one or more of a shipping address, a residential address, a business address, a phone number, a fax number, and an email address of the customer.

13. The apparatus of claim 1, wherein the identification module notifies the customer service representative of the identifier when the communications module establishes the telephonic connection.

14. The apparatus of claim 1, wherein the identifier is transmitted over a communication channel of the telephonic connection.

15. The apparatus of claim 1, wherein the identification module further transmits the billing profile along with the identifier.

16. A method comprising:
establishing a telephonic connection between a customer service representative of a merchant and a customer;
receiving an identifier, the identifier alerting a computer system of the merchant that the customer is associated with a billing profile stored on a computer system external to the computer system available to the merchant and the customer service representative and notifying the customer service representative that the customer is associated with the billing profile, wherein the identifier is one or more of an image and a hyperlink to access the billing profile stored on the external computer system, wherein the billing profile is electronically accessible from the external computer system, the identifier received in conjunction with establishing the telephonic connection, the billing profile electronically stored on the external computer system previous to the telephonic connection;
receiving electronic access to the billing profile, the billing profile comprising billing information of the customer, the billing profile being electronically accessed from the external computer system, via a network, and transmitted to a computer system of the merchant to process a sales order between the customer and the merchant;
receiving a customer approval of the sales order, wherein the customer approval comprises one or more of verbal consent, a signature, a password, a personal identification number, and a biometric attribute;
verifying the customer approval of the sales order by matching the customer approval with a sample previously provided by the customer;
processing the sales order using the billing profile of the customer in response to the customer approval of the sales order, the sales order for one or more of a product and a service offered by the merchant; and
shielding the billing information of the billing profile from the customer service representative wherein the billing information of the billing profile is unavailable for viewing in a display of a computing device associated with the customer service representative while the sales order is processed.

17. The method of claim 16, wherein the billing profile is received in response to an action by the customer, the action approving sending the billing profile to the billing profile access module.

18. The method of claim 17, wherein the action by the customer comprises one or more of
an action by the customer to send the billing profile during the telephonic connection;
a default setting that provides permission to send the billing profile in response to a telephonic connection with a customer service representative of a merchant in which the identifier is sent; and
an action by the customer to approve the sales order.

19. The method of claim 17, further comprising sending sales order information to the customer prior to receiving the customer approval of the sales order.

20. The method of claim 16, wherein the identifier further comprises a sound.

21. The method of claim 16, further comprising receiving and storing the billing profile of the customer in a transaction unrelated to the sales order.

22. An apparatus comprising:
a registration module that creates and stores a billing profile of a customer, wherein the billing profile comprises one or more of a credit card profile, a debit card profile, and a financial institution account profile;
a phone connection module that establishes a telephonic connection between the customer and a customer service representative of a merchant;
an identifier module that sends an identifier to the customer service representative in response to the phone connection module establishing a telephonic connection, the identifier linking the customer to the billing profile, the identifier alerting a computer system of the merchant that the customer is associated with the billing profile stored on a computer system external to the computer system available to the merchant and the customer service representative and notifying the customer service representative that the customer is associated with the billing profile, wherein the identifier is one or more of an image and a hyperlink to access the billing profile stored on the external computer system, wherein the billing profile is electronically accessible from the external computer system; and an approval module that sends a customer approval of a sales order, wherein the customer approval comprises one or more of verbal consent, a signature, a password, a personal identification number, and a biometric attribute;

a billing profile module that provides the customer service representative electronic access to the billing profile of the customer, the billing profile being electronically accessed from the external computer system, via a network, and transmitted to the computer system of the merchant to process the sales order between the customer and the merchant, the customer service representative processing the sales order using the billing profile after verification of the customer approval of the sales order, wherein the customer approval of the sales order is verified by matching the customer approval with a sample previously provided by the customer, the sales order for one or more of a product and a service offered by the merchant, wherein the billing information is shielded from the customer service representative, wherein the billing information of the billing profile is unavailable for viewing in a display of a computing device associated with the customer service representative while the sales order is processed, wherein at least a portion of the registration module, the phone connection module, the identifier module, the approval module, and the billing profile module comprising one or more of hardware and executable code, the executable code stored on one or more computer readable storage media.

23. The apparatus of claim 22, further comprising:

an order information module that receives sales order information from the customer service representative;

wherein the electronic access to the billing profile is provided to the customer service representative in response to the customer approval being sent to the customer service representative.

24. A method comprising:

creating and storing a billing profile, wherein the billing profile comprises one or more of a credit card profile, a debit card profile, and a financial institution account profile;

establishing a telephonic connection between a customer and a customer service representative of a merchant;

sending an identifier to the customer service representative in response to establishing the telephonic connection, the identifier linking the customer to the billing profile, the identifier alerting a computer system of the merchant that the customer is associated with the billing profile stored on a computer system external to the computer system available to the merchant and the customer service representative and notifying the customer service representative that the customer is associated with the billing profile, wherein the identifier is one or more of an image and a hyperlink to access the billing profile stored on the external computer system, wherein the billing profile is electronically accessible from the external computer system, the identifier is sent electronically;

sending a customer approval of a sales order, wherein the customer approval comprises one or more of verbal consent, a signature, a password, a personal identification number, and a biometric attribute;

providing the customer service representative electronic access to the billing profile, the billing profile being electronically accessed from the external computer system, via a network, and transmitted to the computer system of the merchant to process the sales order between the customer and the merchant, the customer service representative processing the sales order using the billing profile after verification of the customer approval of the sales order, wherein the customer approval of the sales order is verified by matching the customer approval with a sample previously provided by the customer, the sales order for one or more of a product and a service offered by the merchant; and shielding the billing information from the customer service representative, wherein the billing information of the billing profile is unavailable for viewing in a display of a computing device associated with the customer service representative while the sales order is processed.

25. The method of claim 24, further comprising:

receiving sales order information from the customer service representative;

wherein the electronic access to the billing profile is provided to the customer service representative in response to the customer approval being sent to the customer service representative.

* * * * *